No. 755,726. Patented March 29, 1904.

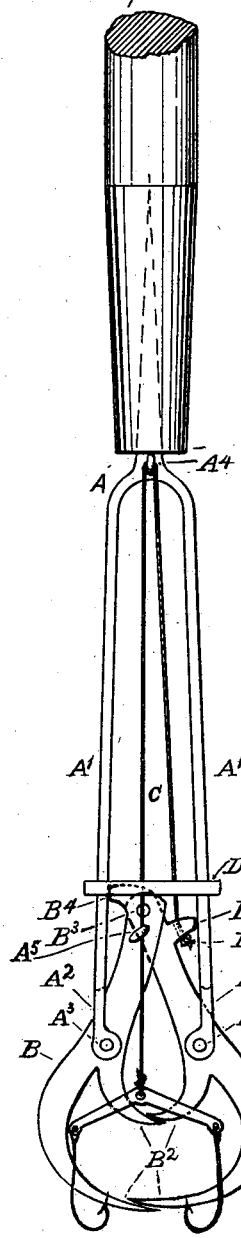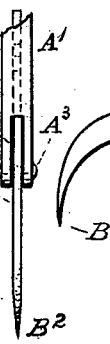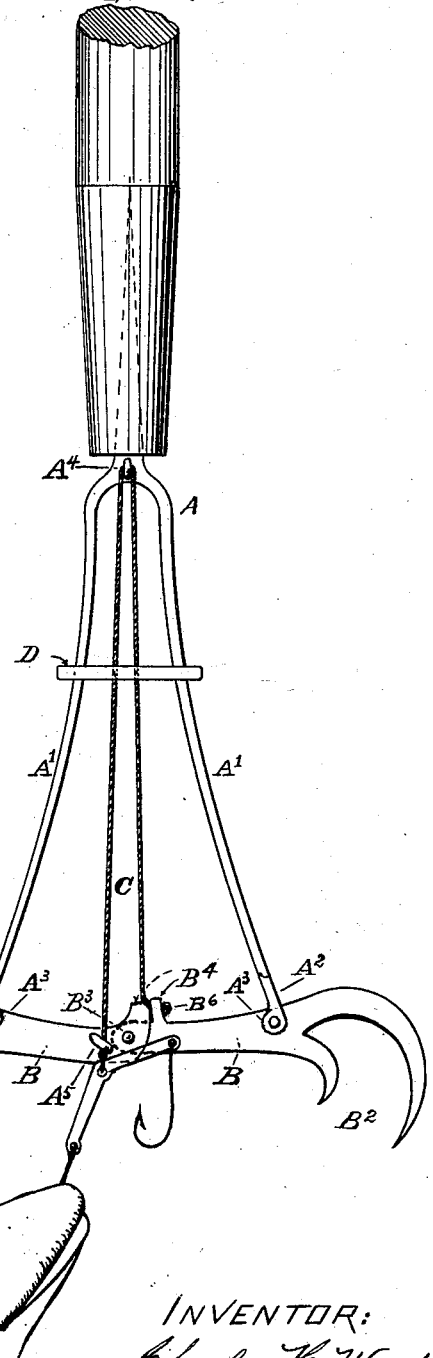

UNITED STATES PATENT OFFICE.

CHARLES H. WARD, OF JACKSON, MICHIGAN, ASSIGNOR TO THOMAS B. TAYLOR, OF JACKSON, MICHIGAN.

FISHING HOOK AND GAFF.

SPECIFICATION forming part of Letters Patent No. 755,726, dated March 29, 1904.

Application filed April 21, 1903. Serial No. 153,641. (No model.)

*To all whom it may concern:*

Be it known that I, CHARLES H. WARD, a citizen of the United States, residing at Jackson, in the county of Jackson and State of Michigan, have invented new and useful Improvements in Fishing Hooks and Gaffs, of which the following is a specification.

My invention relates to improvements in fishing-hooks and fishing-gaffs, in which I combine the two; and the objects of my invention are to secure the fish when the bait is taken by instantly gripping the fish, the fish tripping the gaff-hooks by slightly pulling on the line. I attain these objects by the mechanism illustrated in the accompanying drawings, in which—

Figure 1 is a side elevation of my device with the gaff-hooks closed, and Fig. 2 is the same with the gaff-hooks open. Fig. 3 is an edge view of the end of one of the arms of the fork, showing the manner of securing the jaws.

A is a fork having resilient arms $A'$ $A'$, slotted at their extremities, as indicated at $A^2$ $A^2$, into which slots jaws B B are pivotally secured near their centers by pins or rivets $A^3$ $A^3$ and move easily in the slots $A^2$ $A^2$. One end of the jaws is provided with hooks $B^2$ $B^2$, &c., which operate as gaffs. The opposite ends are pivotally secured together at $B^3$. Detent-lugs $B^4$ $B^4$ prevent the hooks closing together too closely and from opening too far. One end of a fish-line C is secured at or near the rivet $B^3$—say at $B^6$—as shown, and thence upward through the staple or eye $A^4$ and down through a guide-eye $A^5$, and from its end a fish-hook, or preferably two hooks, are suspended, as shown. A collar D is provided, which is made to encircle the resilient arms and easily traverse upward and downward along the arms and act by gravity as a follower to hold the grip gained by the closing together of the arms when the jaws are tripped. When the jaws are open, the rivet $B^3$ should be just a little below the straight line from $A^3$ to $A^3$, so there will be a slight resistance by the lugs $B^4$ $B^4$.

The operation of my device, though obvious, is as follows: The hooks being baited, the ring or collar D is raised and the jaws spread. The device is then suspended in the water for fishing. A slight pull on the line by the fish will draw that end of the line having the fish-hook attached down and the end attached at $B^4$ up, so that the joint $B^3$ will be above the line of center $A^3$ $A^3$, thus tripping the jaws, which will then by the reciprocal spring of the arms close onto the fish, which (by proper adjustment of the length of the line) will then be within the grasp of the hooks.

Having thus fully described my invention, what I claim, and desire to secure by Letters Patent, is—

1. A device of the nature described comprising arms jointedly connected at their adjacent ends and provided with a hook at their outer ends respectively, a fork having resilient arms attached to said jaws respectively intermediate the ends of said jaws, a line arranged to trip said jaws to permit the jaws to close, and a fish-hook connected with said line, whereby the jaws will be operated when a pull is exerted upon the hook attached to said line.

2. A device of the nature described comprising arms jointedly connected at their adjacent ends, and each provided with a hook at its outer end, resilient arms attached at one of the ends thereof to said jaws respectively intermediate the ends of said jaws, a sliding collar embracing said arms, a line arranged to trip said jaws to permit the jaws to close by the resilience of said arms, and a hook upon said line, whereby the jaws will be operated when a pull is exerted upon the hook attached to said line.

3. A device of the nature described comprising jaws jointedly connected at their adjacent ends and provided with a hook at their outer end, a resilient arm attached to each of said jaws intermediate the ends of the jaws, a line arranged to trip the jaws permitting the jaws to close, a hook upon one end of said line, and means to hold the jaws in closed position, the jointed connection of said jaws the one with the other being below a line through the centers of the connection of the jaws with said arms, whereby the jaws will be operated when a pull is exerted upon the hook attached to said line.

4. A device of the nature described comprising jaws pivotally connected together at their adjacent ends and each provided with a hook at its outer end, a fork having resilient arms connected at their lower ends with said jaws intermediate the ends of the jaws respectively, a line to trip said jaws, and a hook upon said line, said jaws provided with detent-lugs substantially as and for the purpose described, whereby the jaws will be operated when a pull is exerted upon the hook attached to said line.

5. A device of the nature described comprising reciprocally opening and closing jaws jointedly connected at their adjacent ends and each provided with a hook at its outer end, a line arranged to trip said jaws by a pull upon said line, a hook connected with said line, and spring-arms connected with said jaws intermediate the ends of the jaws, the line being secured at one end thereof near the point of the pivotal connection of the two jaws the one with the other, and arranged to elevate the inner ends of the arms when a pull is exerted upon the hook connected therewith.

6. A device of the nature described comprising arms jointedly connected at their adjacent ends and each provided with a hook at its outer end, longitudinally-immovable resilient arms rigidly connected together at one extremity thereof and attached at the opposite extremity thereof to said jaws respectively, intermediate the ends of said jaws, a line secured at one end thereof near the point of the pivotal connection of the two jaws one with the other and arranged to trip said jaws to permit the jaws to close by the resilience of said arms, a hook upon the opposite end of said line, and a sliding collar embracing the resilient arms, whereby the jaws will be operated when a pull is exerted upon the hook attached to said line.

7. A device of the nature described comprising arms jointedly connected at their adjacent ends and provided with a hook at their outer ends respectively, a fork having a shank and resilient arms attached to said jaws respectively intermediate the ends of said jaws, a line secured at one end thereof near the point of the pivotal connection of the two jaws one with the other and thence lead upward adjacent to the shank of the fork and provided with a hook at its opposite end whereby said jaws will be tripped by a pull exerted upon the hook connected therewith.

CHARLES H. WARD.

Witnesses:
  M. Stone,
  J. B. Frost.